May 6, 1969

G. H. COGSDILL 3,442,162

DEBURRING TOOL

Filed Jan. 6, 1965

INVENTOR.
GLEN H. COGSDILL
BY
Barnes, Kisselle, Raisch & Choate
ATTORNEYS

United States Patent Office 3,442,162
Patented May 6, 1969

3,442,162
DEBURRING TOOL
Glen H. Cogsdill, 48449 W. 9 Mile Road,
Northville, Mich. 48167
Continuation-in-part of application Ser. No. 393,965,
Sept. 2, 1964. This application Jan. 6, 1965, Ser.
No. 423,706
Int. Cl. B23b 51/10; B23d 77/00
U.S. Cl. 77—73.5                    16 Claims This invention relates to a deburring tool; that is, a tool for removing burrs which usually form around the edges of holes drilled in metal workpieces and is a continuation-in-part of my prior copending application Ser. No. 393,965 filed Sept. 2, 1964 and now abandoned.

In my co-pending application, Ser. No. 105,364, filed Apr. 25, 1961, and now abandoned, there is disclosed and claimed a deburring tool of the type which comprises a shank slotted axially to provide a pair of spring arms formed with cutting edges adjacent their free ends and a plunger threaded into the opposite end of the shank for axial adjustment to control the tension in the spring arms, so that the deburring action of the tool can be modified as desired in accordance with the type of material being worked and also the size of the burr to be removed. The tool illustrated in said co-pending application has had wide commercial acceptance, and the present invention is an improvement thereover only from the standpoint of cost. The tool of the present invention, like the tool disclosed in said co-pending application, incorporates means which are readily adjustable for adapting the tool for deburring holes in metals which differ widely in hardness and for removing burrs of different sizes. However, in the tool of the present invention the cost of manufacture thereof is less than my said prior deburring tool because the need for forming threads on the plunger and in the bore of the shank is eliminated. Other features and advantages of the present invention will become apparent from the following description and drawings, in which FIG. 1 is an elevational view, partly in section, showing the deburring tool of the present invention and the manner in which it operates to deburr the edges of opposite ends of a hole drilled through a metal workpiece.

Figure 1:
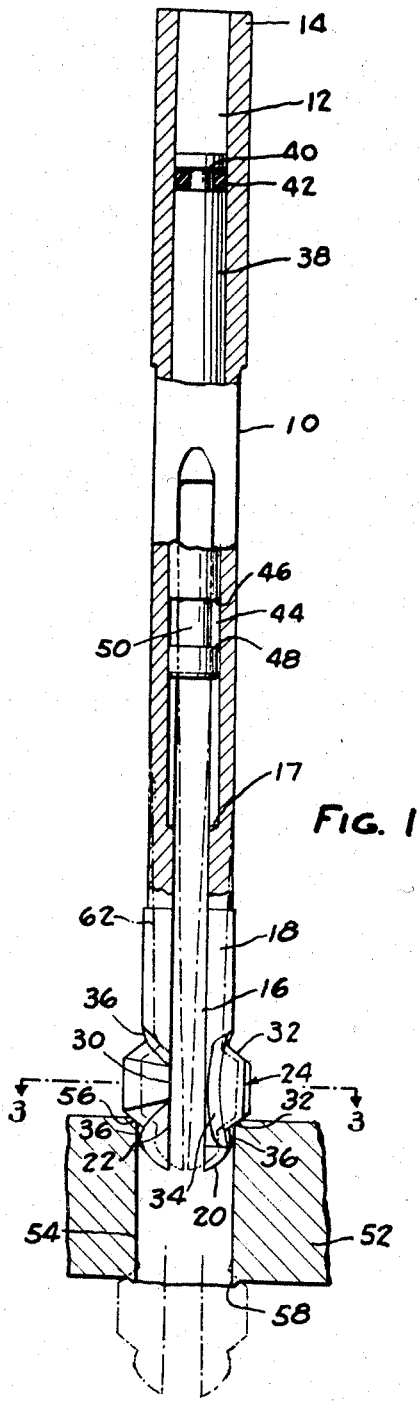
Figure 2:
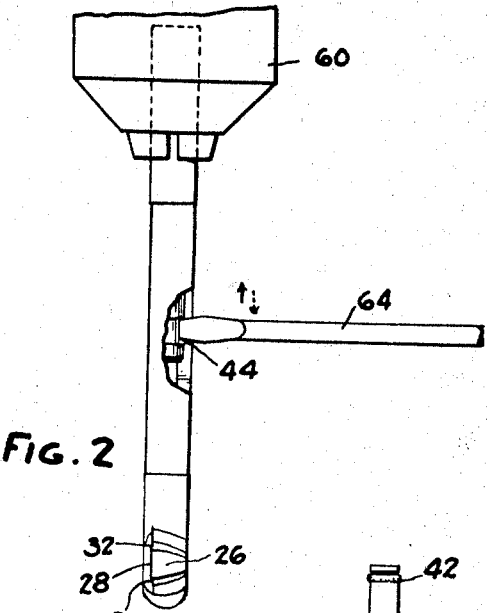
FIG. 2 is a fragmentary elevational view, partly in section, of a chuck in which the tool of the present invention is gripped, and illustrating the manner in which the tension-adjusting plunger is shifted axially of the tool.
Figure 4:
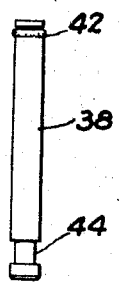
FIG. 4 is an elevational view of the tension-adjusting plunger.
Figure 3:
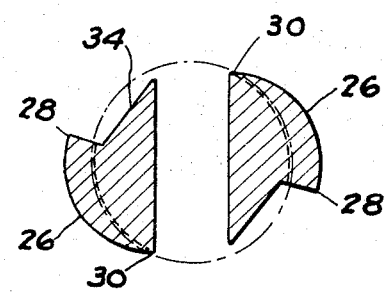
FIG. 3 is a sectional view along the line 3—3 of FIG. 1.

Referring to the drawings, the deburring tool of the present invention comprises a cylindrical body 10 having a bore 12 extending into the body from the end 14 thereof. Body 10 is formed with a through slot 16 from the opposite end thereof so as to form a pair of spring arms 18 on opposite sides of slot 16, the arms being generally semi-cylindrical in shape. Slot 16 is relatively long in comparison with the unslotted portion of body 10, and preferably the width of slot 16 is less than the diameter of bore 12. Bore 12 extends downwardly well into the slotted portion of the body, the bottom of the bore being designated 17.

The lower end of each arm 18 is formed with a rounded nose 20 which merges with a generally cylindrical pilot portion 22. Directly above the pilot portion 22, each arm 18 is formed with a cutting tool portion generally designated 24. Each cutting tool portion 24 is in the form of a radial enlargement on body 10 having an axially extending land 26 which has a radially abrupt leading edge 28 and which tapers gradually radially inwardly at its trailing edge 30 to the cylindrical surface of body 10. The opposite ends of lands 26 are inclined outwardly away from one another in a radially inward direction, as illustrated in FIG. 1, such that at the leading edges 28 of each land 26 oppositely inclined edges 32 are formed. Preferably the body portion 10 is undercut adjacent the leading edge 28 of each land, as indicated at 34, and also undercut adjacent the upper and lower edges of each land 26 as at 36, so that the cutting edges 32 are sharply defined.

Within bore 12 there is arranged a plunger 38 which has a close fit with the bore. The upper end of plunger 38 is fashioned with a circumferential groove 40 in which is retained a rubber O-ring 42. In the condition illustrated in FIG. 1, O-ring 42 is compressed and provides sufficient frictional resistance between plunger 38 and bore 12 to retain the plunger in any position of axial adjustment within the bore. Adjacent its lower end plunger 38 is formed with a second circumferentially extending groove 44, groove 44 being defined by upper and lower square shoulders 46 and 48, respectively, and a central shank portion 50 of reduced diameter.

The purpose of axially adjustable plunger 38 is to vary the effective length of slot 16 and thus vary the tension required to flex spring arms 18 and the cutting tool portions 24 toward one another. If plunger 38 is contracted to a position closer to the upper end of slot 16, arms 18 can be flexed toward one another with substantially less pressure than is required when the plunger is located adjacent the lower end 17 of bore 12. From the practical standpoint this is important for regulating the deburring pressure in relation to the type of material being worked on and the size of burr being removed. For example, referring to FIG. 1, there is illustrated a metal plate 52 through which is drilled hole 54. In many applications it is necessary to remove the burr formed by the drilling operation around the end of the hole, as at 56, on the top side of plate 52, as well as the burr formed around the edge 58 of the hole at the bottom side of the plate.

In using the deburring tool of the present invention, and assuming that the tool is being rotated by a drive member such as the chuck illustrated at 60, the nose and pilot portion of the tool is introduced into the hole 54 and the tool is driven downwardly. The inclined lower cutting edges 32 at the leading edges of cutters 24 engage the edge of the hole at 56 and remove the burr therefrom. Continued axial downward pressure on the tool causes the two spring arms 18 to be cammed inwardly toward each other by the inclined cutting edges 32 to the positions shown in broken lines at 62 in FIG. 1. The pressure required to flex the arms inwardly depends primarily on the effective length of slot 16, and this in turn is determined by the axial position of plunger 38 in bore 12. With the arms flexed inwardly, as illustrated in FIG. 1, the tool can be advanced entirely through the hole 54 in plate 52. It will be noted that the width of slot 16 is greater than the difference in diameters between the shank of body 10 and the cutting tools formed by the enlarged lands 26.

When the cutting tools emerge from the hole 54 at the bottom side of plate 52, an upward force is then applied to the tool so that the cutting edges 32 at the upper ends of lands 26 engage and deburr the edge 58 of the hole as the tool is retracted upwardly through the workpiece.

Depending upon the material being worked upon and the size of the hole being deburred, the force required to flex the arms 18 inwardly toward each other will vary considerably. If it is desired to increase the tension of arms 18, plunger 38 is shifted axially toward the free ends of spring arms 18, and if it is desired to decrease the tension in arms 18, plunger 38 is shifted axially toward the end 14 of the tool. The length of plunger 38 is slightly greater than the length of the unslotted portion of body 10. Thus the circumferential groove 44 is always accessible through slot 16, and axial adjustment of plunger 38 can be readily effected by simply inserting the end of a screwdriver, such as indicated at 64, into groove 44 and shifting plunger 38 axially. The compressed state of O-ring 42 produces sufficient friction with bore 12 to retain plunger 38 in any position to which it is adjusted. O-ring 42 not only prevents accidental axial displacement of plunger 38 when the tool is being handled but produces sufficient friction to prevent axial displacement of plunger 38 in the course of a deburring operation. The use of a frictional connection between plunger 38 and the bore 12 has a two-fold advantage. The cost thereof is considerably less than that of forming threads in these members, and additionally this type of connection does not require any externally projecting members on the shank of the tool which might interfere with a successful deburring operation in tight quarters.

I claim:

1. A deburring tool comprising a cylindrical body having a through slot of uniform width at one portion thereof extending axially to one end of the body to provide a pair of spring arms which are adapted to flex toward each other, the opposite end of said body having a bore therein extending into said slot, a plunger in said bore projecting into said slot for varying the effective length of the slot and means for retaining the plunger in fixed position within said bore and slot comprising means on the plunger slidably engaging said bore with sufficient frictional contact to retain the plunger in an axially adjusted position.

2. A deburring tool comprising a cylindrical body having a through slot of uniform width at one portion thereof extending axially to one end of the body to provide a pair of spring arms which are adapted to flex toward each other, the opposite end of said body having a bore therein extending into said slot, a plunger in said bore projecting into said slot for varying the effective length of said slot, said plunger being slidable axially in said bore and having a close fit therein, said plunger having a length at least slightly greater than the length of the unslotted portion of said body and friction means within said bore interengaging said plunger and bore for retaining the plunger in axially adjusted position in the bore and against accidental axial displacement therein.

3. A deburring tool as called for in claim 2, wherein said friction means comprises a ring member interposed between the plunger and bore, said ring member being formed of a resilient compressible plastic material.

4. A deburring tool as called for in claim 2, wherein said friction means comprises an O-ring.

5. A deburring tool as called for in claim 2, wherein said friction means comprises a rubber O-ring mounted on said plunger and movable therewith.

6. A deburring tool as called for in claim 2, wherein said plunger is fashioned with a circumferentially extending groove and said friction means comprises an O-ring in said groove.

7. A deburring tool as called for in claim 6, wherein said groove is located adjacent the end of the plunger remote from said slot.

8. A deburring tool comprising a cylindrical body having a through slot of uniform width at one portion thereof extending axially to one end of the body to provide a pair of spring arms which are adapted to flex toward each other, the opposite end of said body having a bore therein extending into said slot, a plunger slidably arranged in said bore, said plunger having a length greater than the length of the unslotted portion of said body, means adjacent the end of the plunger within the end of the slot forming a shoulder thereon which is accessible through the slot for gripping the plunger to enable sliding it axially toward and away from the cutting end of the tool and means forming a sliding frictional connection between the plunger and the bore for retaining the plunger in axially adjusted position within the bore.

9. A deburring tool as called for in claim 8, wherein said shoulder-forming means comprises a circumferentially extending shoulder on the plunger spaced axially inwardly of the end of the plunger within the slot.

10. A deburring tool as called for in claim 8, wherein said shoulder-forming means comprises a circumferentially extending groove in the plunger adjacent but spaced inwardly of the end of the plunger within the slot.

11. A deburring tool as called for in claim 8, wherein the diameter of the bore is greater than the width of said slot and said bore extends into said spring arms for a distance equal to approximately at least one-half the length of the spring arms.

12. A deburring tool as called for in claim 8, wherein said retaining means comprises an O-ring encircling said plunger and engaging said bore.

13. A deburring tool as called for in claim 12, wherein said retaining means comprises a rubber O-ring compressibly disposed between said plunger and bore.

14. A deburring tool as called for in claim 13, wherein said plunger is fashioned with a circumferentially extending groove in which the O-ring is disposed.

15. In a deburring tool, a tubular body having a driving end and a cutting end containing a diametrical slot dividing the cutting end into two portions, a pin within the body having a fulcrum head at one end and an expanded portion at the opposite end which produces frictional engagement with the inner wall of the body for retaining the fulcrum head in any adjusted position, and a cutting nib on the forward end of at least one of said two cutting end portions.

16. In a deburring tool, a tubular body having a diametrical slot therein providing two portions which are relatively movable toward each other, a nib on one of said portions near the forward end thereof, a pin having a necked portion at one end to provide a fulcrum head which is adjusted to change the bending moment of the two portions, and means providing frictional engagement between the inner wall of the tubular body and the pin to secure the pin in adjusted position therein.

References Cited

UNITED STATES PATENTS 3,217,570  11/1965  Cogsdill _____ 77—73.5

FRANCIS S. HUSAR, *Primary Examiner.*

U.S. Cl. X.R.

77—76; 145—123